United States Patent
Kim et al.

(10) Patent No.: US 9,118,909 B2
(45) Date of Patent: Aug. 25, 2015

(54) STEREOSCOPIC IMAGE DISPLAY AND DRIVING METHOD THEREOF

(75) Inventors: Kiltae Kim, Gyeonggi-do (KR); Hyeonho Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1016 days.

(21) Appl. No.: 13/173,653

(22) Filed: Jun. 30, 2011

(65) Prior Publication Data

US 2012/0007895 A1    Jan. 12, 2012

(30) Foreign Application Priority Data

Jul. 8, 2010  (KR) .................. 10-2010-0065714

(51) Int. Cl.
| | | |
|---|---|---|
| *H04N 13/04* | (2006.01) | |
| *H04N 13/00* | (2006.01) | |
| *G09G 3/36* | (2006.01) | |
| *G09G 3/20* | (2006.01) | |
| *G09G 3/34* | (2006.01) | |

(52) U.S. Cl.
CPC ......... *H04N 13/0438* (2013.01); *G09G 3/3648* (2013.01); *H04N 13/0025* (2013.01); *G09G 3/2022* (2013.01); *G09G 3/3406* (2013.01); *G09G 2320/0209* (2013.01)

(58) Field of Classification Search
CPC .................. G09G 2320/0276; G09G 2360/16; G09G 2320/0626
USPC .......................... 345/77–87, 102, 690; 349/15
See application file for complete search history.

(56) References Cited

U.S. PATENT DOCUMENTS

| 5,821,989 | A | 10/1998 | Lazzaro et al. | |
|---|---|---|---|---|
| 8,525,872 | B2 * | 9/2013 | Choi et al. | 348/51 |
| 8,526,502 | B2 * | 9/2013 | Blume | 375/240.16 |
| 2007/0229395 | A1 | 10/2007 | Slavenburg et al. | |
| 2008/0316303 | A1 * | 12/2008 | Chiu et al. | 348/51 |
| 2009/0079818 | A1 | 3/2009 | Saishu et al. | |
| 2010/0066820 | A1 * | 3/2010 | Park et al. | 348/53 |
| 2010/0245400 | A1 * | 9/2010 | Nakahata et al. | 345/690 |

FOREIGN PATENT DOCUMENTS

| CN | 101398608 | 4/2009 |
|---|---|---|
| CN | 101409051 | 4/2009 |

OTHER PUBLICATIONS

Chinese Office Action for corresponding CN Application No. 201110197063.7 dated Aug. 9, 2013.

* cited by examiner

*Primary Examiner* — Kumar Patel
*Assistant Examiner* — Mansour M Said
(74) *Attorney, Agent, or Firm* — Morgan, Lewis & Bockius LLP

(57) ABSTRACT

A stereoscopic image display device includes a liquid crystal display panel on which frame data is addressed, a frame rate conversion unit that divides 3D input data into left eye image data and right eye image data, and inserts reset frame data including black grayscale data between the left eye image data and the right eye image data, and a luminance difference compensation unit that generates compensation values for compensating a luminance difference depending on positions in a screen of the liquid crystal display panel, wherein a compensation value added to the left eye image data and the right eye image data to be displayed on an upper part of the screen of the liquid crystal display panel is higher than a compensation value added to the left eye image data and the right eye image data to be displayed under the upper part of the screen.

13 Claims, 11 Drawing Sheets

STEREOSCOPIC IMAGE DISPLAY AND DRIVING METHOD THEREOF

This application claims the benefit of Korea Patent Application No. 10-2010-0065714 filed on Jul. 8, 2010, the entire contents of which is incorporated herein by reference for all purposes as if fully set forth herein.

BACKGROUND

1. Field

This document relates to a stereoscopic image display device and a driving method thereof.

2. Related Art

Stereoscopic image display devices are classified into a stereoscopic technique and an autostereoscopic technique.

The stereoscopic technique uses binocular parallax images which are great in the stereoscopic effect, and may have a type of using glasses ("glasses type") and a type of not using glasses ("non-glasses type"). In the glasses type, binocular parallax images are displayed on a direct view display element or a projector by changing polarization directions or in the temporal division manner, and polarization glasses or liquid crystal shutter glasses are used to implement stereoscopic images. In the non-glasses type, the stereoscopic images are implemented by dividing optical axes of binocular parallax images, by using optical plates such as parallax barriers or lenticular lenses.

An example of the glasses type stereoscopic image display device is disclosed in U.S. Pat. No. 5,821,989 or U.S. Unexamined Patent Application Publication No. US2007/0229395A1.

FIG. 1 is a schematic diagram illustrating a stereoscopic image display device of the glasses type. A black part of the shutter glasses ST is a lens for blocking light directing toward a viewer and a white part thereof is a lens for transmitting light directing toward the viewer. In FIG. 1, if a liquid crystal display is selected as a display device DIS, a backlight unit (BLU) providing light to the display device DIS is necessary.

Referring to FIG. 1, the left eye lens $ST_L$ of the shutter glasses ST is opened when left eye image data $RGB_L$ is addressed in the display device DIS during odd frames. The right eye lens $ST_R$ is opened when right eye image data $RGB_R$ is addressed in the display device DIS during even frames. Therefore, a viewer sees only left eye images with the left eye during the odd frames and sees only right eye images with the right eye during the even frames, thereby obtaining a three-dimensional effect by binocular parallax.

However, in the stereoscopic image display device, a luminance difference may occur depending on positions in a screen. Further, a 3D crosstalk phenomenon in which a left eye image and a right eye image overlap with each other may be generated in the stereoscopic image display device in the 3D mode.

SUMMARY

Embodiments of this document provide a stereoscopic image display device and a driving method thereof capable of reducing a luminance difference depending on positions in a screen.

According to an exemplary embodiment of this document, there is provided a stereoscopic image display device including a liquid crystal display panel on which frame data is addressed in order of a (n+1)-th (wherein n is a positive integer) frame data to a (n+4)-th frame data; a frame rate conversion unit that divides 3D input data into left eye image data and right eye image data, and inserts reset frame data including black grayscale data between the left eye image data and the right eye image data, thereby generating the (n+1)-th frame data including the left eye image data, the (n+2)-th frame data including the black grayscale data, the (n+3)-th frame data including the right eye image data, and the (n+4)-th frame data including the black grayscale data; and a luminance difference compensation unit that generates compensation values for compensating a luminance difference depending on positions in a screen of the liquid crystal display panel.

According to another exemplary embodiment of this document, there is provided a driving method of a stereoscopic image display device including a liquid crystal display panel on which frame data is addressed in order of a (n+1)-th (wherein n is a positive integer) frame data to a (n+4)-th frame data, the driving method including dividing 3D input data into left eye image data and right eye image data; inserting reset frame data including black grayscale data between the left eye image data and the right eye image data, thereby generating the (n+1)-th frame data including the left eye image data, the (n+2)-th frame data including the black grayscale data, the (n+3)-th frame data including the right eye image data, and the (n+4)-th frame data including the black grayscale data; generating compensation values for compensating a luminance difference depending on positions in a screen of the liquid crystal display panel; and adding the compensation values to the left eye image data and the right eye image data.

A compensation value added to the left eye image data and the right eye image data to be displayed on an upper part of the screen of the liquid crystal display panel is higher than a compensation value added to the left eye image data and the right eye image data to be displayed under the upper part of the screen of the liquid crystal display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
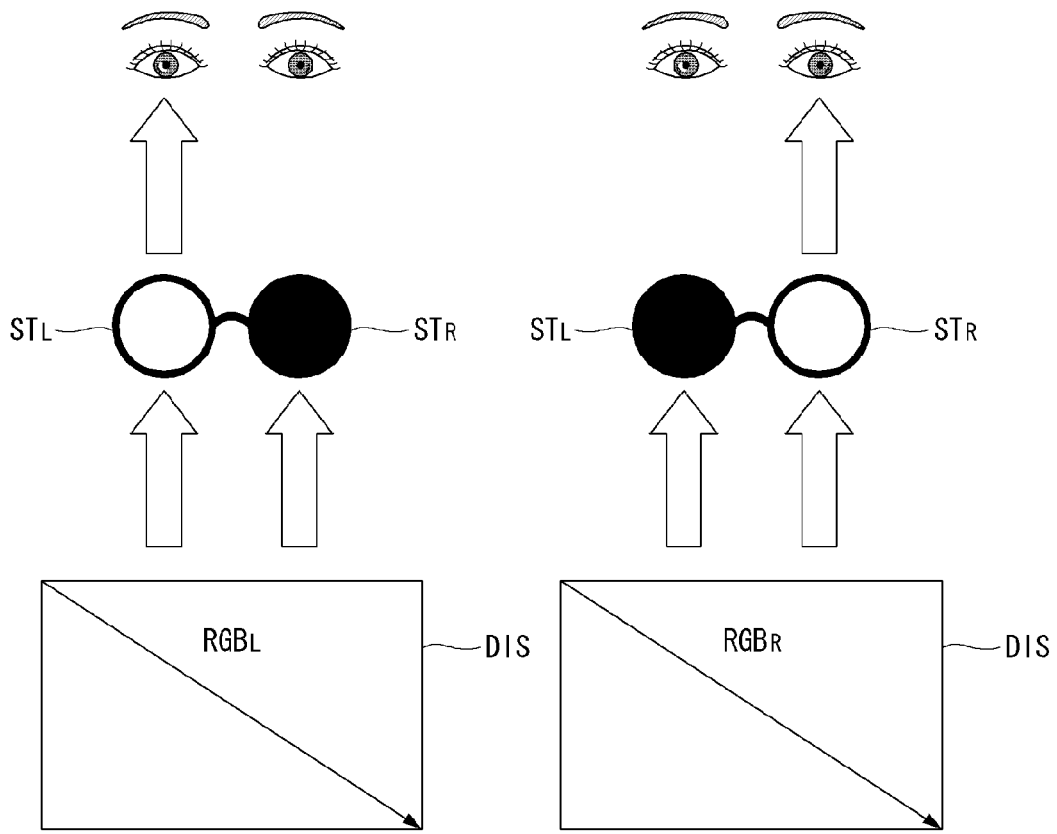
FIG. 1 is a diagram illustrating a temporal division operation of left and right images in a glasses type stereoscopic image display device.

Hereinafter, exemplary embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Figure 2:
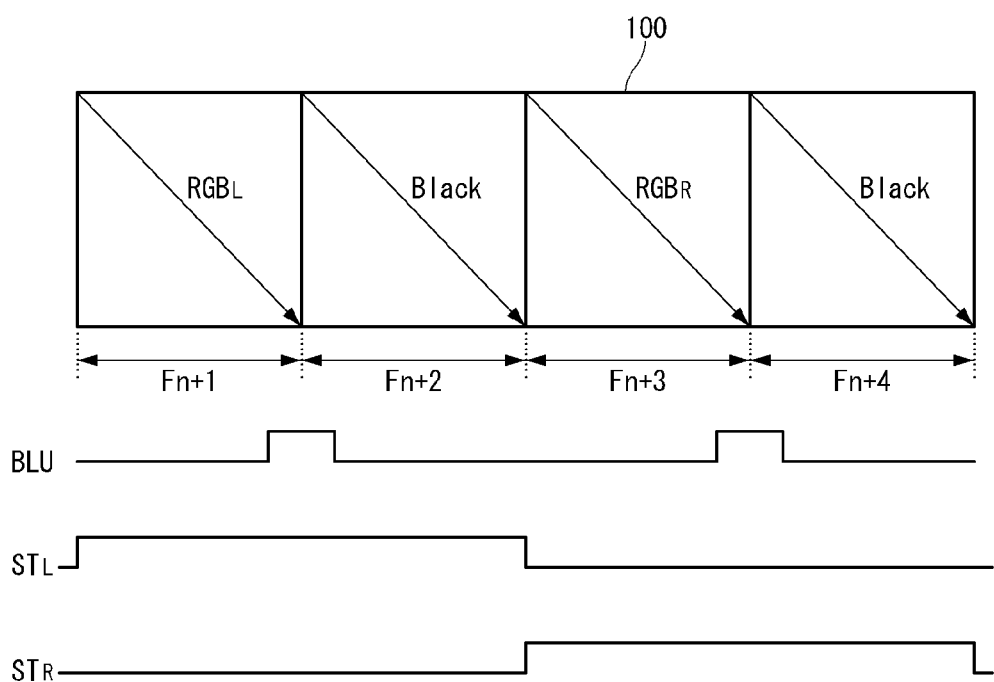
FIG. 2 is a diagram illustrating a driving method of the stereoscopic image display device according to an embodiment of this document.

Referring to FIG. 2, in a stereoscopic image display device according to an embodiment of this document, during a (n+1)-th (where n is a positive integer) frame period Fn+1, left eye image data is addressed in a liquid crystal display panel 100. During a (n+3)-th frame period Fn+3, right eye image data $RGB_R$ is addressed in the liquid crystal display panel. In addition, in the stereoscopic image display device, a reset frame is inserted between the left eye image data frame Fn+1 and the right eye image data frame Fn+3. The reset frame periods in FIG. 2 are the (n+2)-th frame period Fn+2 and the (n+4)-th frame period Fn+4. All of pixel data of the reset frame is black grayscale data, and is set in advance with no relation to pixel data of an input image. The black grayscale data is "00000000$_2$" when expressed by 8-bit digital data.

When the stereoscopic image display device is implemented using a liquid crystal display, a backlight unit for providing light to the liquid crystal display panel 100 is necessary. The backlight unit repeats turning-on and turning-off. The backlight turning-on time includes the latter parts of the left or right eye frame periods Fn+1 and Fn+3 when the left eye (or right eye) image data $RGB_L$ (or $RGB_R$) is addressed in the liquid crystal display panel, and the former parts of the reset frame periods Fn+2 and Fn+4 when the black grayscale data is addressed in the liquid crystal display panel. The backlight unit may irradiate overall screen of the liquid crystal display panel with light. Further, a light emitting surface of the backlight unit may be divided into a plurality of blocks. The blocks of the backlight unit are sequentially turned on within the turning-on time shown in FIG. 2 along the scanning direction of the liquid crystal display panel.

The stereoscopic image display device includes shutter glasses for dividing light for a left eye image and light for a right eye image. The shutter glasses have a left eye lens and a right eye lens which are electrically turned on and off. The left eye lens $ST_L$ of the shutter glasses is opened to transmit light for a left eye image during the left eye frame period Fn+1 and the reset frame period Fn+2 subsequent thereto, and is closed to block light for a left eye image during the right eye frame period Fn+3 and the reset frame period Fn+4 subsequent thereto. The right eye lens $ST_R$ of the shutter glasses is opened to transmit light for a right eye image during the left eye frame period Fn+3 and the reset frame period Fn+4 subsequent thereto, and is closed to block light for a right eye image during the left eye frame period Fn+1 and the reset frame period Fn+2 subsequent thereto.

Figure 3:
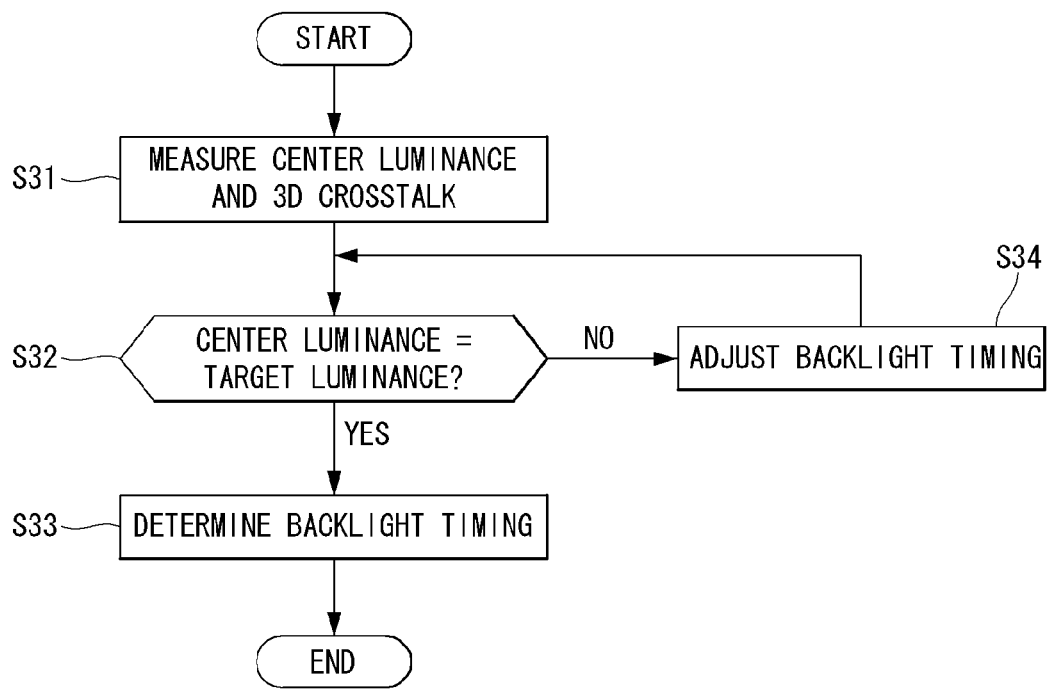
FIG. 3 is a flowchart illustrating a backlight tuning method for setting turning-on timings of the backlight unit shown in FIG. 2.
Figure 4:
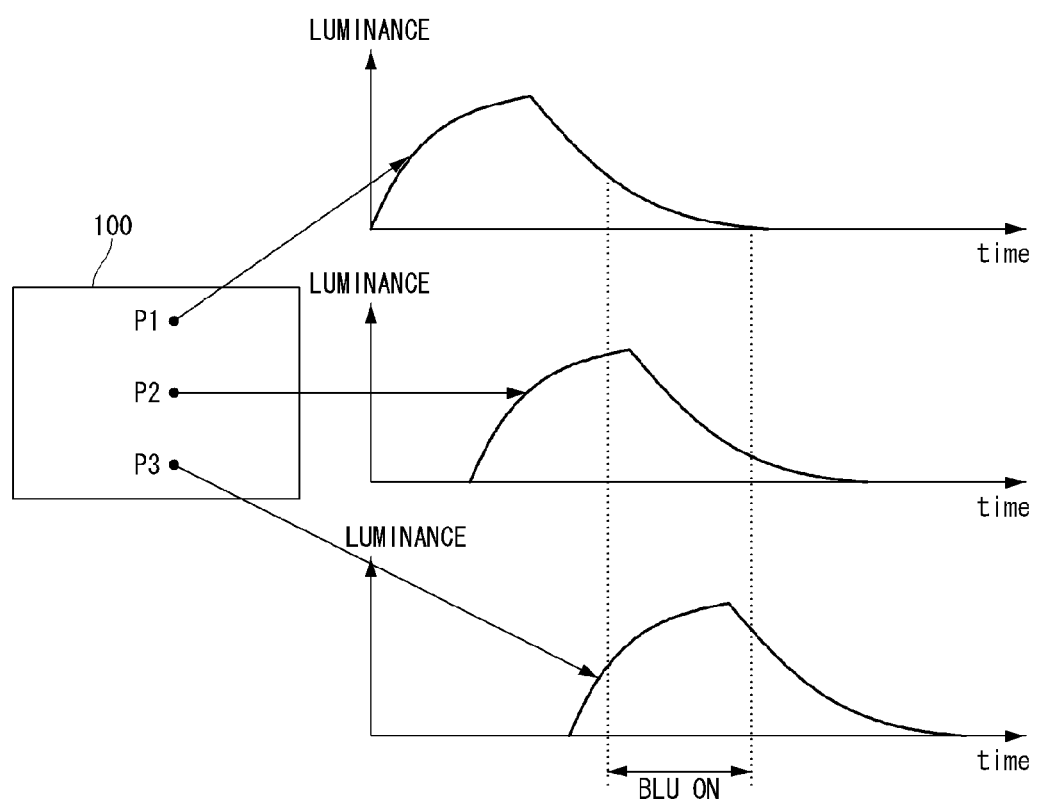
FIG. 4 is a diagram illustrating a luminance difference depending on positions in a screen in the backlight tuning method as shown in FIG. 3.

FIGS. 3 and 4 are diagrams illustrating a backlight turning-on timing tuning method.

With reference to FIGS. 3 and 4, a central part luminance (or a center luminance) of the liquid crystal display panel 100 and 3D crosstalk are measured (S31), and a backlight turning-on timing when the central part luminance reaches a target luminance for each grayscale is determined as being an optimal turning-on timing (S32 and S33). Here, the 3D crosstalk means a degree that a left eye image and a right eye image overlap with each other on one eye of a user, and may be calculated using the following Equation 1 based on a luminance measuring value of light passing through the left eye lens and the right eye lens of the shutter glasses. In step S32, if the central part luminance does not reach a target luminance for each grayscale, the backlight turning-on timing is adjusted until reaching a target luminance for each grayscale (S34).

$$CT_{3D}(\%) = \frac{BW - BB}{WB - BB} \times 100 \qquad (1)$$

Here, BW denotes a luminance measuring value for the black grayscale when light for the white grayscale is incident to one of both the lenses of the shutter glasses and light for the black grayscale is incident to the other thereof. WB denotes a luminance measuring value for the white grayscale when light for the white grayscale is incident to one of both the lenses of the shutter glasses and light for the black grayscale is incident to the other thereof. BB denotes a luminance measuring value for the black grayscale which is incident to one of both the lenses when light for the black grayscale is incident to both the lenses of the shutter glasses. The white grayscale is "11111111$_2$" when expressed by 8-bit digital data, and the black grayscale is "00000000$_2$" when expressed by 8-bit digital data. Each unit of BW, WB, and BB is cd/m$^2$.

When the backlight turning-on timing is determined using the central part of the screen as a reference as shown in FIG. 3, a luminance difference is observed depending on positions in the screen. In FIG. 4, the graphs shown in the right part indicate luminances measured at the upper part P1 of the screen, the central part P2 of the screen, and the lower part P3 of the screen. When data is scanned from the upper part to the lower part in the liquid crystal display panel 100, the backlight turning-on timing BLU ON is determined using the central part of the screen as a reference, the luminance at the upper part of the screen is lower than the luminance at the central part, and the luminance at the lower part of the screen is higher than the luminance at the central part. The 3D crosstalk measured at the upper part of the screen is smaller than that measured at the central part, and the 3D crosstalk measured at the lower part of the screen is greater than that measured at the central part. This phenomenon occurs since data scanning timings are different depending on positions in the screen at the backlight turning-on timing BLU ON, and influences of the black data which is applied during the reset frames are different depending on positions in the screen. Hereinafter, a method for reducing a luminance difference depending on positions in the screen and 3D crosstalk in the overall screen will be described.

Figure 5:
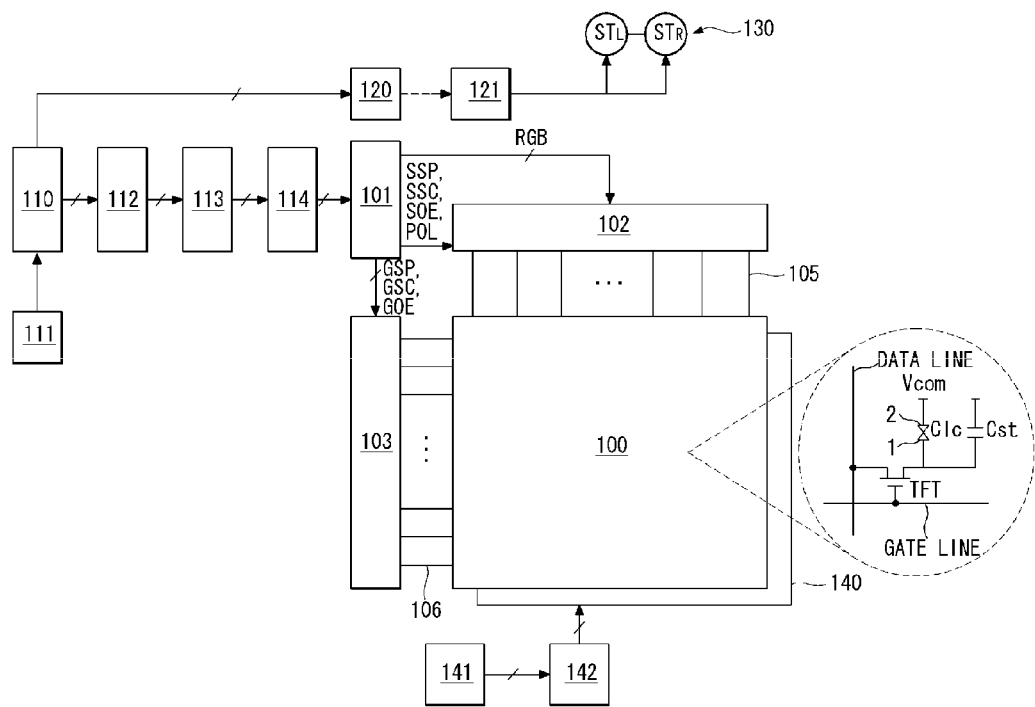
FIG. 5 is a block diagram illustrating the stereoscopic image display device according to the embodiment of this document.

Referring to FIG. 5, a stereoscopic image display device according to an embodiment of the this document includes a liquid crystal display panel 100, a backlight unit 140, a timing controller 101, a data driving circuit 102, a gate driving circuit 103, a backlight controller 141, a light source driving unit 142, a host system 110, a frame rate conversion unit 112, a 3D crosstalk compensation unit 113, a luminance difference compensation unit 114, and shutter glasses 130.

The liquid crystal display panel 100 is provided with a liquid crystal layer interposed between two glass substrates. The liquid crystal display panel 100 includes liquid crystal cells disposed at the intersections of data lines 105 and gate lines (or scan lines) 106 in a matrix.

The lower glass substrate of the liquid crystal display panel 100 is provided with a plurality of data lines 105 and a plurality of gate lines 106, TFTs (thin film transistors), and storage capacitors Cst. The liquid crystal cells of the liquid crystal display panel 100 are driven by pixel electrodes 1 connected to the TFTs and common electrodes 2 supplied with a common voltage. Black matrices, color filters, and the common electrodes are formed on the upper glass substrate of the liquid crystal display panel 100. Polarizers are respectively attached to the outer surfaces of the lower and upper glass substrate of the liquid crystal display panel 100, and alignment layers are formed to set pretilt angles of the liquid crystal molecules. The common electrodes may be disposed on the upper glass substrate in a vertical electric field driving type such as a TN (twisted nematic) mode and a VA (vertical alignment) mode, and may be disposed on the lower glass substrate along with the pixel electrodes in a horizontal electric field type such as an IPS (in plane switching) mode and an FFS (fringe field switching) mode.

The liquid crystal display panel 100 may be implemented by a liquid crystal display panel of any other type as well as liquid crystal display panels of the TN mode, the VA mode, the IPS mode, and the FFS mode.

The backlight unit 140 may be implemented by a direct type backlight unit or an edge type backlight unit. The edge type backlight unit has a structure in which light sources are disposed to face lateral surfaces of a light guide plate (not shown), and a plurality of optical sheets are disposed between the liquid crystal display panel 100 and the light guide plate. The direct backlight unit has a structure in which a plurality of optical sheets and a diffusion plate are stacked under the liquid crystal display panel 100, and a plurality of light sources are disposed under the diffusion plate. The light sources may use one or more of a cold cathode fluorescent lamp (CCFL), an external electrode fluorescent lamp (EEFL), and a light emitting diode (LED).

The timing controller 101 supplies digital video data RGB which is input via the frame rate conversion unit 112, the 3D crosstalk compensation unit 113, and the luminance difference compensation unit 114 to the data driving circuit 102. In addition, the timing controller 101 receives timing signals such as a vertical synchronization signal Vsync, a horizontal synchronization signal Hsync, a data enable signal DE, main clock CLK, from the host system 110 via the frame rate conversion unit 112, the 3D crosstalk compensation unit 113, and the luminance difference compensation unit 114, and generates control signals for controlling operation timings of the data driving circuit 102 and the gate driving circuit 103. The control signals include gate timing control signals for controlling operation timings of the gate driving circuit 103, and data timing signals for controlling operation timings of the data driving circuit 102 and polarities of the data voltages.

The timing controller 101 may change a 2D mode operation and a 3D mode operation based on a mode signal (not shown) output from the host system 110 via the frame rate conversion unit 112, the 3D crosstalk compensation unit 113, and the luminance difference compensation unit 114, or based on a mode identifying code encoded in an input image signal.

The gate timing control signals include a gate start pulse GSP, gate shift clocks GSC, a gate output enable signal GOE, and so forth. The gate start pulse GSP is input to a gate drive IC generating the first gate pulse, and controls the gate drive IC to generate the first gate pulse. The gate shift clocks GSC are clock signals commonly input to the gate drive ICs and are used as clock signals for shifting the gate start pulse GSP. The gate output enable signal GOE controls output timings of the gate drive ICs.

The data timing control signals include a source start pulse SSP, a source sampling clock SSC, a polarity control signal POL, a source output enable signal SOE, and so on. The source start pulse SSP controls data sampling start timings in the data driving circuit 102. The source sampling clock SSC is a clock signal which controls data sampling timings with respect to a rising edge or a falling edge in the data driving circuit 102. The polarity control signal POL controls polarities of the data voltages output from the data driving circuit 102. The source output enable signal SOE controls output timings of the data driving circuit 102. If the digital video data to be input to the data driving circuit 102 is transmitted by a mini LVDS interface specification, the source start pulse SSP and the source sampling clock SSC may be omitted.

The data driving circuit 102 latches the digital video data RGB from the timing controller 101, under the control of the timing controller 101. The data driving circuit 102 converts the digital video data RGB into positive gamma compensation voltages and negative gamma compensation voltages. Also, the data driving circuit 102 reverses the polarities of the data voltages output to the data lines 105 in response to the polarity control signal POL.

The gate driving circuit 103 sequentially supplies gate pulses (or scan pluses) to the gate lines 106 in response to the gate timing control signals.

The backlight controller 141 may determine the 2D mode and the 3D mode based on a mode signal output from the host system 110 or the timing controller 101. The backlight controller 141 supplies backlight control data to the light source driving unit 142 to adjust the luminance of the backlight depending on a global or local dimming signal output from the host system 110 or the timing controller 101. The backlight control data may be supplied to the light source driving unit 142 in an SPI (serial peripheral interface) data format, and includes PWM (pulse width modulation) duty ratio information, PWM rising timing information, and PWM falling timing information according to the dimming signal. The backlight control data is determined using the central part of the screen as a reference. In addition, the backlight controller 141 decreases the PWM duty ratio of the backlight control data in the 3D mode more than in the 2D mode, thereby reducing a turning-on ratio of the light sources of the backlight unit BLU in the 3D mode. The backlight controller 141 may control the light sources of the backlight unit BLU at the duty ratio of 100% in the 2D mode. The backlight controller 141 may be embedded in the timing controller 101.

The light source driving unit 142 decreases the PWM duty ratio of the light sources in the 3D mode in response to the backlight control data from the backlight controller 141, thereby reducing the turning-on ratio of the light sources more than in the 2D mode.

The host system 110 supplies data for 2D images or 3D images and the timing signals Vsync, Hsync, DE and CLK to the timing controller 101 via an interface such as an LVDS (Low Voltage Differential Signaling) or a TMDS (Transition Minimized Differential Signaling) interface. The host system 110 supplies 2D images to the timing controller 101 in the 2D mode, and supplies left eye images and right eye images to the timing controller 101 in the 3D mode. The host system 110 or the timing controller 101 may analyze image data, and generate the diming signal by calculating a global or local dimming value, in order to heighten the contrast characteristic of a displayed image according to a result of the analysis.

A user may select the 2D mode and the 3D mode via a user input device 111. The user input device 111 includes a touch screen attached to the liquid crystal display panel 100 or embedded therein, an on screen display (OSD), a keyboard, a mouse device, a remote controller, and the like. The host system 110 changes a 2D mode operation and a 3D mode operation in response to user data input via the user input device 111. The host system 110 may change the 2D mode operation and the 3D mode operation using a 2D and 3D identifying code encoded in the input image data. The host system 110 may generate a mode signal used to identify whether a current driving mode is the 2D mode or the 3D mode, and transmit it to the frame rate conversion unit 112, the timing controller 101, and the backlight controller 141.

In order to alternately open and close the left eye lens $ST_L$ and the right eye lens $ST_R$ of the shutter glasses 130 in the 3D mode, the host system 110 outputs a shutter control signal via a shutter control signal transmitter 120. The shutter control signal transmitter 120 transmits the shutter control signal to a shutter control signal receiver 121 via a wired or wireless interface. The shutter control signal receiver 121 may be embedded in the shutter glasses 130 or attached to the shutter glasses 130 by being manufactured as an independent module.

The shutter glasses 130 include a left eye lens $ST_L$ and a right eye lens $ST_R$ which are electrically controlled independently from each other. Each of the left eye lens $ST_L$ and the right eye lens $ST_R$ has a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON or OFF voltages. Each of the left eye lens $ST_L$ and the right eye lens $ST_R$ transmits light from the liquid crystal display panel 100 when the ON voltage is applied to the second transparent electrode, whereas it blocks light from the liquid crystal display panel 100 when the OFF voltage is applied to the second transparent electrode.

The shutter control signal receiver 121 receives the shutter control signal via a wired or wireless interface, and alternately opens and closes the left eye lens $ST_L$ and right eye lens $ST_R$ depending on the shutter control signal. When the shutter control signal having a first logic value is input to the shutter control signal receiver 121, the second transparent electrode of the left eye lens $ST_L$ is applied with the ON voltage, whereas the second transparent electrode of the right eye lens $ST_R$ is applied with the OFF voltage. When the shutter control signal having a second logic value is input to the shutter control signal receiver 121, the second transparent electrode of the left eye lens $ST_L$ is applied with the OFF voltage, whereas the second transparent electrode of the right eye lens $ST_R$ is applied with the ON voltage. Thus, the left eye lens $ST_L$ of the shutter glasses 130 is opened when the shutter control signal having the first logic value is generated, and the right eye lens $ST_R$ of the shutter glasses 130 is opened when the shutter control signal having the second logic value is generated.

The frame rate conversion unit 112 divides, in the 3D mode, the one frame data for 3D images from the host system 110 into left eye image data and right eye image data, and expands each of the left eye image data and the right eye image data to one frame data. The frame rate conversion unit 112 reads black grayscale data stored in an internal register to generate reset frame data, and inserts the reset frame data between a left eye frame and a right eye frame. Therefore, the frame rate conversion unit 112 generates the 3D image data as shown in FIG. 2 through the separation and the insertion of the data input in the 3D mode, and transmits the data to the 3D crosstalk compensation unit 113 at a frame frequency which is four times higher than an input frame frequency. For example, if an input frame frequency of the frame rate conversion unit 112 is 50 Hz, a frame frequency output from the frame rate conversion unit 112 is 200 Hz. If the input frame frequency of the frame rate conversion unit 112 is 60 Hz, a frame frequency output from the frame rate conversion unit 112 is 240 Hz. The input frame frequency is 50 Hz in the PAL (Phase Alternate Line) system, and is 60 Hz in the NTSC (National Television Standards Committee) system.

The frame rate conversion unit 112, in the 2D mode, inserts two frame data between a (N+1)-th frame data and a (N+2)-th frame data for 2D images by a data frame interpolation method such as an MEMC (Motion Estimation Motion Compensation). Therefore, the frame rate conversion unit 112 transmits the data input in the 2D mode to the 3D crosstalk compensation unit 113 at the frame frequency four times higher than the input frame frequency. The 2D image data output from the frame rate conversion unit 112 passes through the 3D crosstalk compensation unit 113 and the luminance difference compensation unit 114 and then is input to the timing controller 101. The timing controller 101 may modulates the 2D image data using the existing over-driving method, thereby improving a response speed of the liquid crystal. In the over-driving modulation method of 2D image data, modulation values satisfying the following relation may be set in a predefined lookup table, and the lookup table may be embedded in the timing controller 101.

$$PIX(Fn) < PIX(Fn-1) \rightarrow PIX'(Fn) < PIX(Fn),$$

$$PIX(Fn) = PIX(Fn-1) \rightarrow PIX'(Fn) = PIX(Fn), \text{ and}$$

$$PIX(Fn) > PIX(Fn-1) \rightarrow PIX'(Fn) > PIX(Fn).$$

Here, PIX(Fn) denotes pixel data for a 2D input image which is input during the current frame, and PIX(Fn−1) denotes pixel data for a 2D input image which is input during the previous frame. In addition, PIX'(Fn) is a modulation value output from the lookup table for the over-driving modulation. The lookup table for the over-driving modulation compares pixel data of the previous frame and pixel data of the current frame and outputs modulation data satisfying the above relation according to the comparison result. Therefore, the lookup table for the over-driving modulation outputs the modulation value PIX' (Fn) which is higher than the pixel data of the current frame if the pixel data PIX(Fn−1) of the previous frame is higher than the pixel data PIX(Fn) of the current frame, and modulates the current frame data PIX(Fn) into the modulation value PIX' (Fn) which is smaller than the pixel data PIX(Fn) of the current frame if the pixel data PIX(Fn−1) of the previous frame is smaller than the pixel data PIX(Fn) of the current frame. In addition, if the pixel data PIX(Fn) of the current frame is the same as pixel data PIX(Fn−1) of the previous frame, the lookup table for the over-driving modulation outputs the modulation value PIX' (Fn) which is the same as the pixel data PIX(Fn) of the current frame.

Figure 6:
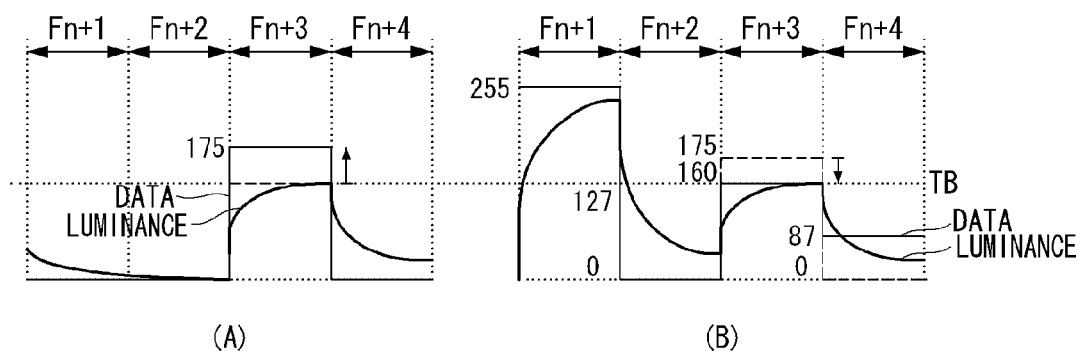
FIG. 6 is a diagram illustrating a principle of reducing 3D crosstalk.

On the other hand, when pixel data for 3D images as shown in FIG. 2 is modulated by the existing over-driving method, 3D crosstalk may be problematic. For example, a case A is assumed in which, in FIG. 6, grayscales for left eye image pixel data of the (n+1)-th frame and black data of the (n+2)-th frame are "0", and a grayscale for right eye image pixel data of the (n+3)-th frame is changed to 175. Further, a case B is assumed in which a grayscale for left eye image pixel data of the (n+1)-th frame is "255", a grayscale for black data of the (n+2)-th frame is "0", and a grayscale for right eye image pixel data of the (n+3)-th frame is changed to 175. In the cases A and B, the luminance for the (n+2)-th frame is not same as each other due to the delay characteristic of the liquid crystal response and a difference between the pre-previous frame and the current frame at the same grayscale value. The pre-previous frame period is the (n+1)-th frame period if the current frame period is the (n+3)-th frame in FIG. 6. The pixel luminance for the (n+2)-th frame in the case B is higher than the luminance for the (n+2)-th frame in the case A since the left eye image pixel data of the pre-previous frame is higher than in the case A.

The 3D crosstalk compensation unit 113 modulates pixel data for left eye and right eye frames such that the pixel luminance for the liquid crystal display panel 100 can have the same luminance at the same grayscale during the current frame regardless of a difference between left eye (or right eye) image pixel data of the pre-previous frame and right eye (or left eye) image pixel data of the current frame in the 3D mode. The 3D crosstalk compensation unit 113 compares pixel data of the pre-previous frame with pixel data of the current frame. In addition, the 3D crosstalk compensation unit 113 modulates right eye (or left eye) image pixel data of the current frame according to the comparison result of the left eye and right eye image pixel data of the pre-previous frame and the current frame. As an example, the 3D crosstalk compensation unit 113 compares left eye (right eye) image pixel data of the pre-previous frame with right eye (or left eye) image pixel data of the current frame as in FIG. 6, and modulates the grayscale value "175" for the right eye pixel data of the current frame in the case B into "160", thereby obtaining the same luminance TB as in the case A. The modulation values in the 3D crosstalk compensation unit 113 may be implemented by a lookup table which outputs a modulation value for a current frame through comparison of left eye (or right eye) image pixel data of a pre-previous frame with right eye (or left eye) image pixel data of the current frame. A 3D crosstalk modulation value is set to a grayscale value reaching a target luminance for a grayscale of left or right eye pixel data of a current frame through comparison of left or right eye pixel data of the pre-previous frame with left or right eye pixel data of the current frame.

The 3D crosstalk compensation unit 113 may modulate black data by reflecting pixel data for a left eye (or right eye) image of the pre-previous frame on black data of a reset frame which is a previous frame. A compensation method in the 3D crosstalk compensation unit 113 is described in detail in Korean Patent Application Nos. 10-2010-0042975 (May 7, 2010), 1-2010-0042969 (May 7, 2010), and the like, which have been filed by the present applicant.

Figure 7:
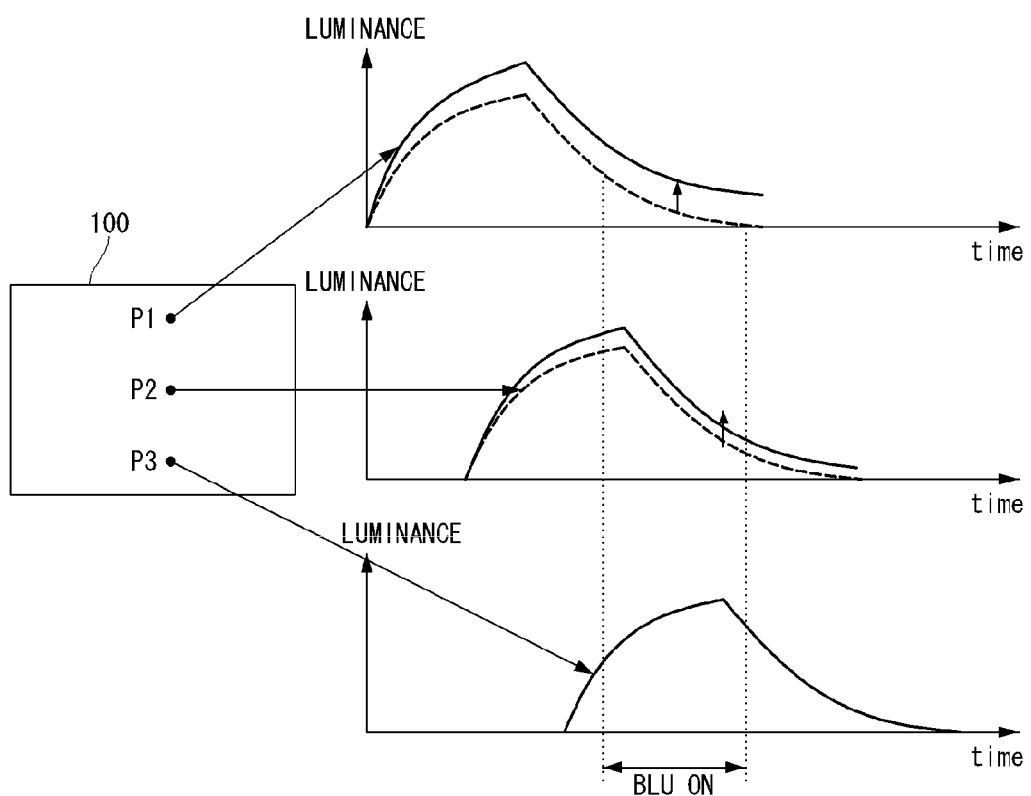
FIG. 7 is a diagram illustrating a principle of compensating a luminance difference.

The luminance difference compensation unit 114 adds a compensation value to the pixel data for the left eye and right eye images which are output from the 3D crosstalk compensation unit 113, and compensates the luminance difference depending on positions in the screen. The luminance difference may be generated through real-time calculations depending on positions in the screen, or registered in a lookup table by being set in advance through tests. Therefore, the luminance difference compensation unit 114 may be implemented by a real-time calculation logic circuit or a lookup table. The compensation value is set to a higher value as a position in the screen goes to the upper part of the screen as shown in FIG. 7, and thus the luminance for the 3D image which is darkened toward the upper side of the screen as shown in FIG. 4 is uniformly compensated.

Figure 8:
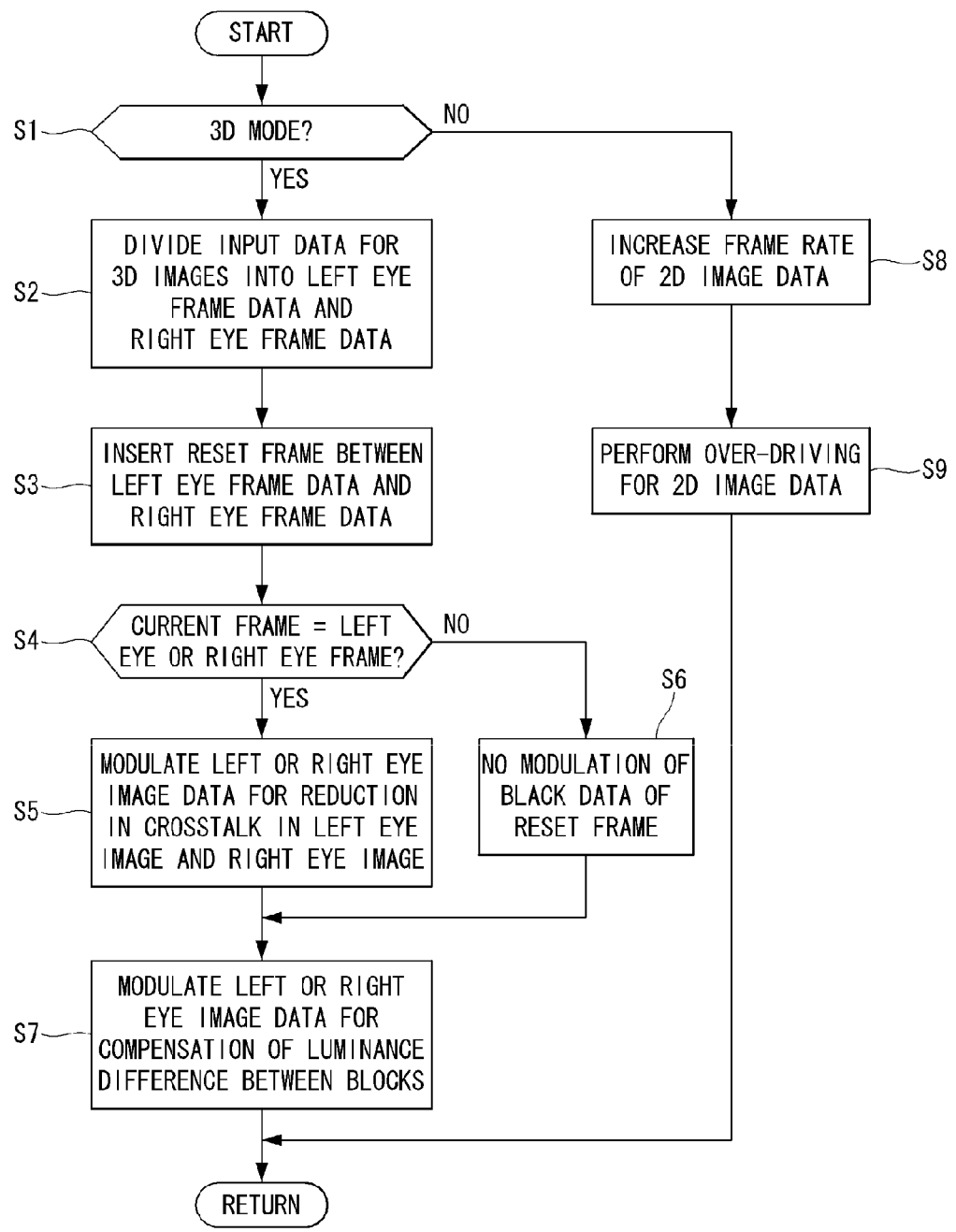
FIG. 8 is a flowchart illustrating a driving method of the stereoscopic image display device according to the embodiment of this document.

FIG. 8 is a flowchart illustrating a driving method of the stereoscopic image display device according to the embodiment of this document. The description of the driving method in FIG. 8 will be made along with the circuit block shown in FIG. 5.

In FIG. 8, the frame rate conversion unit 112 divides input data for 3D images into left eye frame data and right eye frame data in the 3D mode, and then inserts reset frame data containing black grayscale data between the left eye frame data and the right eye frame data (S1 to S3).

If the current frame period is a left eye or right eye frame period, the 3D crosstalk compensation unit 113 compares left or right eye pixel data of the pre-previous frame set in advance and the current frame with each other, and modulates the left or right eye pixel data of the current frame into a modulation value set in advance if there is a difference between the pixel data (S4 and S5). If the current frame period is a reset frame period, the 3D crosstalk compensation unit 113 allows the black grayscale data of the reset frame period to pass therethrough without the modulation (S4 and S6). On the other hand, the 3D crosstalk compensation unit 113 may modulate the black grayscale data of the reset frame by reflecting left or right image data on the black grayscale data of the reset frame.

The luminance difference compensation unit 114 selects a higher value from compensation values set by a real-time calculation or set in a lookup table as a position in the screen goes to the upper part, and adds the selected compensation value to the pixel data, thereby compensating the luminance difference depending on the positions in the screen (S7).

The frame rate conversion unit 112 increases the frame rate of input data for 2D images to four times in the 2D mode, and the timing controller 101 modulates pixel data for the 2D images into an over-driving modulation value set in advance (S8 and S9).

Figure 9:
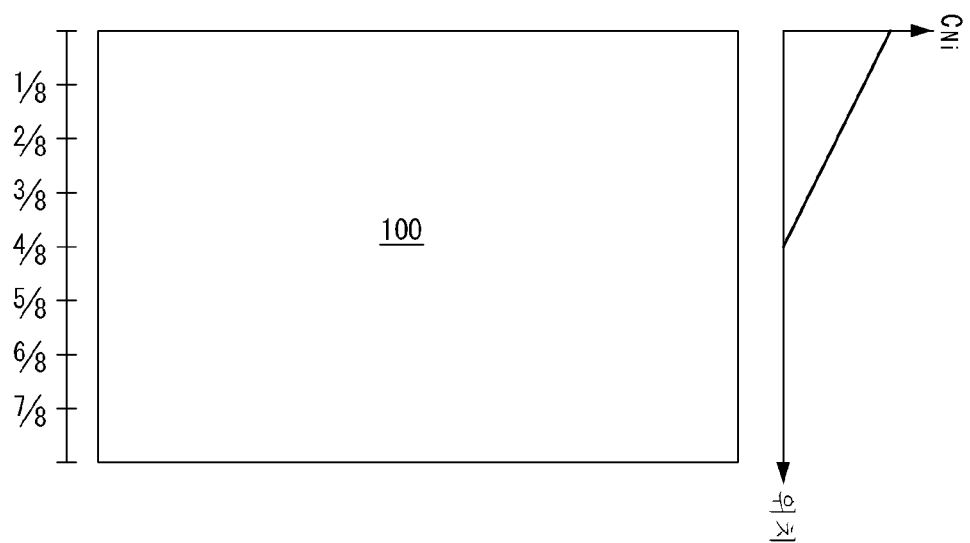
FIGS. 9 to 11 are diagrams illustrating various embodiments of compensation values for compensating a luminance difference depending on positions in a screen.
Figure 10:
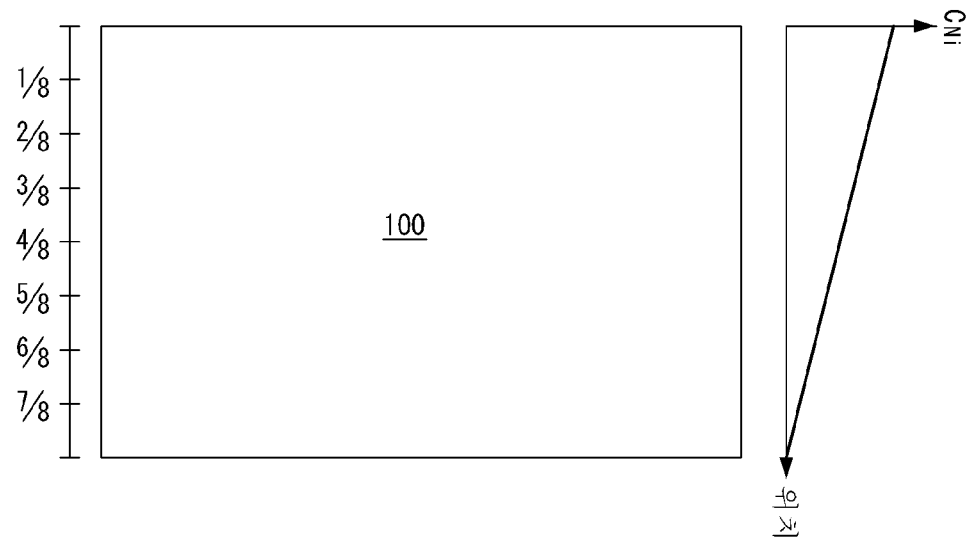
Figure 11:
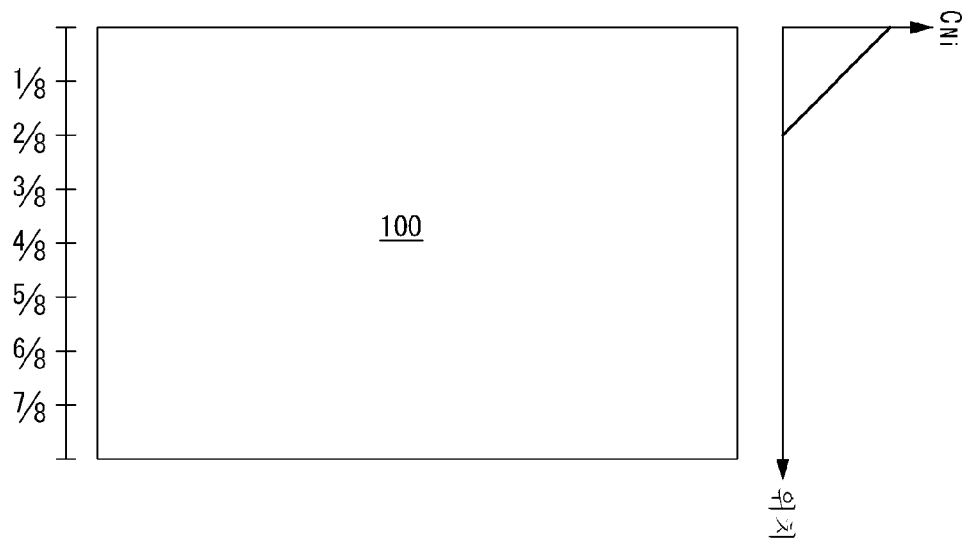
Figure 12:
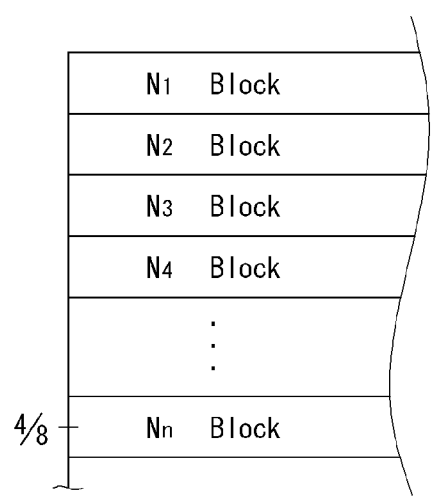
FIG. 12 is a diagram illustrating an example where a compensation value for compensating a luminance difference depending on positions in a screen.

FIGS. 9 to 11 show various embodiments of a compensation value CNi for compensating the luminance difference depending on the positions in the screen.

In order to compensate the luminance difference, the screen of the liquid crystal display panel is equally divided into I (where I is a positive integer which is 2 or more and the number of the display lines of the screen or less). The compensation value CNi may be set to be different with one display line unit or with block units. Here, a block includes two or more display lines. The liquid crystal display panel is divided into at least two blocks when the luminance difference is compensated with block units. FIGS. 9 to 11 show an example where the liquid crystal display panel 100 is divided into eight blocks (I=8), and, in this case, the compensation value CNi is set with block units.

The compensation value CNi is set to "0" at the central part (a position of 4/8) as shown in FIG. 9 if the screen is divided into two portions, and may be calculated as a higher value as a position in the screen goes from the central part to the upper part. As another embodiment, the compensation value CNi is set to "0" at the lower part of the screen as shown in FIG. 10, and may be calculated as a higher value as a position in the screen goes from the lower part to the upper part. As still another embodiment, the compensation value CNi is set to "0" at a position of 2/8 (or 2/8) as shown in FIG. 11, and may be calculated as a higher value as a position in the screen goes from the position of 2/8 (or 3/8) to the upper part.

A compensation value CNi at the uppermost end of the screen, that is, the highest compensation value may be set as a specific compensation value.

In a case where the compensation value CNi is calculated in the same manner as FIG. 9, and the compensation value CNi is calculated with block units with regard to N blocks, the compensation value CNi may be calculated by the following Equation 2. Here, it is assumed that a compensation value for the uppermost block N1 of the screen is Gray$_{initial}$=127, and a compensation value for the central part (the position of 4/8) of the screen is Gray$_{final}$=0, respectively.

If $i > 1$, $$N_i Block\ Data = (Gray_{final} - Gray_{initial}) \times \frac{N_i}{N} + Gray_{initial} \quad (2)$$

Here, i is a block number and is a positive integer.

If the number of blocks N is assumed as ten, a compensation value for each block is calculated as follows by assigning Gray$_{initial}$=127, Gray$_{final}$=0, and N=10 to Equation 2.

A compensation value Gray$_{initial}$ for the first block N$_1$ Block=127, a compensation value N$_2$ Block Data for the second block N$_2$ Block=−127×2/10+127=101.6, a compensation value N$_3$ Block Data for the third block N$_3$ Block=−127×3/10+127=88.9, a compensation value N$_4$ Block Data for the fourth block N$_4$ Block=−127×4/10+127=76.2, and a compensation value Gray$_{final}$ for the tenth block N$_{10}$ Block=0.

Therefore, as the compensation value CNi for compensating the luminance difference, a compensation value added to pixel data for a left or right eye image to be displayed on the upper part of the screen is higher than a compensation value added to pixel data for a left or right eye image to be displayed under the upper part of the screen.

In order to ascertain effects achieved by the luminance difference compensation, the present inventors measured the luminance at each of the positions of 1/8, 2/8, and 4/8 of the screen when the luminance difference compensation was not performed in the driving method as in FIG. 2, and measured the luminance after adding the compensation values calculated as described above to pixel data. The present inventors ascertained that the luminance difference occurs depending on the positions in the screen as shown in Table 1 in the former case, but the luminance for the 2/8 block is increased to compensate the luminance difference depending on the positions in the screen as shown in Table 2 in the latter case.

TABLE 1

|     | 255 | 223 | 191 | 159 | 127 | 95 | 63 | 31 | 0 |
|-----|-----|-----|-----|-----|-----|------|------|------|------|
| 1/8 | 28  | 20.1 | 13.5 | 9.2 | 5.6 | 2.86 | 1.06 | 0.21 | 0.09 |
| 2/8 | 39  | 27.7 | 18.8 | 11.7 | 7.8 | 4.00 | 1.48 | 0.27 | 0.09 |
| 4/8 | 66  | 49.0 | 34.5 | 22.7 | 13.9 | 7.60 | 2.81 | 0.43 | 0.11 |

TABLE 2

|     | 255 | 223 | 191 | 159 | 127 | 95 | 63 | 31 | 0 |
|-----|-----|-----|-----|-----|-----|------|------|------|------|
| 2/8 | 68  | 48.9 | 31.7 | 18.3 | 10.4 | 4.96 | 1.69 | 0.29 | 0.10 |

As another embodiment of this document, the 3D crosstalk compensation unit 113 and the compensation algorithm may be omitted in a liquid crystal display having low 3D crosstalk in the 3D mode.

As described above, according to this document, a higher compensation value is set at an upper part of the screen, and the compensation value is added to pixel data for a left or right eye image, thereby reducing a luminance difference depending on positions in the screen. Further, according to this document, left or right eye image data of a pre-previous frame is compared with left or right eye image data of a current frame, and the current frame data is modulated according to the comparison result, thereby reducing 3D crosstalk.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device, comprising:
   a liquid crystal display panel on which frame data is addressed in order of a (n+1)-th frame data to a (n+4)-th frame data, n being a positive integer;
   a frame rate conversion unit that divides 3D input data into left eye image data and right eye image data, and inserts reset frame data including black grayscale data between the left eye image data and the right eye image data, thereby generating the (n+1)-th frame data including the left eye image data, the (n+2)-th frame data including the black grayscale data, the (n+3)-th frame data including the right eye image data, and the (n+4)-th frame data including the black grayscale data;
   a shutter control signal transmitter that outputs a shutter control signal to shutter glasses, the shutter control signal controlling:
      the left eye lens to be opened during a (n+1)-th frame period and a (n+2)-th frame period when the (n+1)-th frame data and the (n+2)-th frame data are addressed in the liquid crystal display panel; and
      the right eye lens to be opened during a (n+3)-th frame period and a (n+4)-th frame period when the (n+3)-th frame data and the (n+4)-th frame data are addressed in the liquid crystal display panel;
   a backlight unit that provides light to the liquid crystal display panel by periodically repeating turning on and off, the backlight unit being turned on:
      through a latter part of the (n+1)-th frame period and a former part of the (n+2)-th frame period; and
      through a latter part of the (n+3)-th frame period and a former part of the (n+4)-th frame period; and
   a luminance difference compensation unit that generates compensation values for compensating a luminance difference depending on positions in a screen of the liquid crystal display panel according to a turning-on timing of the backlight unit,
   wherein a compensation value added to the left eye image data and the right eye image data to be displayed on an upper part of the screen of the liquid crystal display panel is higher than a compensation value added to the left eye image data and the right eye image data to be displayed under the upper part of the screen of the liquid crystal display panel.

2. The stereoscopic image display device of claim 1, further comprising:
   the shutter glasses comprising the left eye lens and the right eye lens.

3. The stereoscopic image display device of claim 1, wherein the compensation values are set to be different for each display line of the liquid crystal display panel.

4. The stereoscopic image display device of claim 1, wherein:
when the liquid crystal display panel is divided into a plurality of blocks, the compensation values are set to be different for each block; and
each of the blocks includes two or more display lines in the liquid crystal display panel.

5. The stereoscopic image display device of claim 4, wherein, when the liquid crystal display panel is equally divided into two portions, the compensation values:
are set to 0 at a central part of the screen; and
are set to higher values as a position in the screen goes from the central part to the upper part.

6. The stereoscopic image display device of claim 4, wherein the compensation values:
are set to 0 at the lowermost end of the screen of the liquid crystal display panel; and
are set to higher values as a position in the screen goes from the lowermost end to the upper part.

7. The stereoscopic image display device of claim 4, wherein, when the screen of the liquid crystal display panel is equally divided into eight portions, the compensation values:
are set to 0 at a position of 2/8 or 3/8 which is located on the upper side of the screen; and
are set to higher values as a position in the screen goes from the position of 2/8 or 3/8 to the upper part.

8. The stereoscopic image display device of claim 1, further comprising a 3D crosstalk compensation unit that:
compares the (n+1)-th frame data with the (n+3)-th frame data; and
modulates the (n+3)-th frame data if there is a grayscale value difference between the (n+1)-th frame data and the (n+3)-th frame data.

9. The stereoscopic image display device of claim 8, wherein the luminance difference compensation unit:
generates compensation values for compensating a luminance difference depending on positions in the screen of the liquid crystal display panel; and
adds the compensation values to the left eye image data and the right eye image data output from the 3D crosstalk compensation unit.

10. A driving method of a stereoscopic image display device including a liquid crystal display panel on which frame data is addressed in order of a (n+1)-th (wherein n is a positive integer) frame data to a (n+4)-th frame data, a shutter control signal transmitter that outputs a shutter control signal to shutter glasses, and a backlight unit that provides light to the liquid crystal display panel by periodically repeating turning on and off, the driving method comprising:
dividing 3D input data into left eye image data and right eye image data;
inserting reset frame data including black grayscale data between the left eye image data and the right eye image data, thereby generating the (n+1)-th frame data including the left eye image data, the (n+2)-th frame data including the black grayscale data, the (n+3)-th frame data including the right eye image data, and the (n+4)-th frame data including the black grayscale data;
generating compensation values for compensating a luminance difference depending on positions in a screen of the liquid crystal display panel according to a turning-on timing of the backlight unit; and
adding the compensation values to the left eye image data and the right eye image data,
wherein a compensation value added to the left eye image data and the right eye image data to be displayed on an upper part of the screen of the liquid crystal display panel is higher than a compensation value added to the left eye image data and the right eye image data to be displayed under the upper part of the screen of the liquid crystal display panel,
wherein the shutter control signal controls:
the left eye lens to be opened during a (n+1)-th frame period and a (n+2)-th frame period when the (n+1)-th frame data and the (n+2)-th frame data are addressed in the liquid crystal display panel, and
the right eye lens to be opened during a (n+3)-th frame period and a (n+4)-th frame period when the (n+3)-th frame data and the (n+4)-th frame data are addressed in the liquid crystal display panel, and
wherein the backlight unit is turned on:
through a latter part of the (n+1)-th frame period and a former part of the (n+2)-th frame period, and
through a latter part of the (n+3)-th frame period and a former part of the (n+4)-th frame period.

11. The driving method of claim 10, further comprising:
comparing the (n+1)-th frame data with the (n+3)-th frame data; and
modulating the (n+3)-th frame data if there is a grayscale value difference between the (n+1)-th frame data and the (n+3)-th frame data.

12. The driving method of claim 10, wherein, in the adding of the compensation values, the compensation values are added to the modulated left eye image data and right eye image data.

13. A stereoscopic image display device, comprising:
a liquid crystal display panel on which frame data is addressed in order of a (n+1)-th frame data to a (n+4)-th frame data, n being a positive integer;
a frame rate conversion unit that divides 3D input data into left eye image data and right eye image data, and inserts reset frame data including black grayscale data between the left eye image data and the right eye image data, thereby generating the (n+1)-th frame data including the left eye image data, the (n+2)-th frame data including the black grayscale data, the (n+3)-th frame data including the right eye image data, and the (n+4)-th frame data including the black grayscale data;
a shutter control signal transmitter that outputs a shutter control signal to shutter glasses, the shutter control signal controlling:
the left eye lens to be opened during a (n+1)-th frame period and a (n+2)-th frame period when the (n+1)-th frame data and the (n+2)-th frame data are addressed in the liquid crystal display panel; and
the right eye lens to be opened during a (n+3)-th frame period and a (n+4)-th frame period when the (n+3)-th frame data and the (n+4)-th frame data are addressed in the liquid crystal display panel;
a backlight unit that provides light to the liquid crystal display panel by periodically repeating turning on and off, the backlight unit being turned on:
through a latter part of the (n+1)-th frame period and a former part of the (n+2)-th frame period; and
through a latter part of the (n+3)-th frame period and a former part of the (n+4)-th frame period; and
a luminance difference compensation unit that generates compensation values for compensating a luminance difference depending on positions in a screen of the liquid crystal display panel according to a turning-on timing of the backlight unit, wherein a compensation value added to the left eye image data and the right eye image data to be displayed on an upper part of the screen of the liquid crystal display panel is higher than a compensation value added to the left eye image data and the right eye image data to be displayed under the upper part of the screen of the liquid crystal display panel, wherein:
  when the liquid crystal display panel is divided into a plurality of blocks, the compensation values are set to be different for each block; and
  each of the blocks includes two or more display lines in the liquid crystal display panel, and wherein the compensation values:
  are set to a low value at the a portion of the screen of the liquid crystal display panel other than the upper part of the screen; and
  are set to higher values as a position in the screen goes from the portion of the screen of the liquid crystal display panel other than the upper part of the screen to the upper part of the screen.

\* \* \* \* \*